United States Patent
Nelson

(10) Patent No.: US 11,190,981 B1
(45) Date of Patent: Nov. 30, 2021

(54) SYSTEMS AND METHODS FOR MONITORING AND MANAGING NETWORK TRAFFIC IN A PRIVATE CELLULAR NETWORK

(71) Applicant: Geoverse, LLC, Sammamish, WA (US)

(72) Inventor: Roderick Nelson, Sammamish, WA (US)

(73) Assignee: GEOVERSE, LLC, Bellevue, WA (US)

( * ) Notice: Subject to any disclaimer, the term of this patent is extended or adjusted under 35 U.S.C. 154(b) by 0 days.

(21) Appl. No.: 16/940,739

(22) Filed: Jul. 28, 2020

(51) Int. Cl.
*H04W 28/10* (2009.01)
*H04W 8/08* (2009.01)
*H04L 29/06* (2006.01)
*H04W 4/90* (2018.01)

(52) U.S. Cl.
CPC .......... *H04W 28/10* (2013.01); *H04L 65/102* (2013.01); *H04L 65/105* (2013.01); *H04W 4/90* (2018.02); *H04W 8/082* (2013.01)

(58) Field of Classification Search
CPC . H04L 63/0272; H04L 61/2514; H04L 63/10; H04L 12/4633; H04L 63/20; H04L 12/66; H04L 65/105; H04L 65/102; H04W 12/086; H04W 84/12; H04W 36/14; H04W 84/22; H04W 92/02; H04W 84/16; H04W 28/10; H04W 8/082; H04W 4/90
See application file for complete search history.

(56) References Cited

U.S. PATENT DOCUMENTS 8,739,269 B2 * 5/2014 Dargis .................. H04L 63/164
726/13
2007/0008885 A1 * 1/2007 Bonner ................. H04L 63/107
370/230
2008/0119165 A1 * 5/2008 Mittal ................... H04L 63/029
455/411
2014/0287760 A1 * 9/2014 Spinelli ................. H04W 76/12
455/437
2014/0341109 A1 * 11/2014 Cartmell ................ H04L 43/50
370/328
2017/0006034 A1 * 1/2017 Link, II ............... H04L 61/2514
2019/0387394 A1 * 12/2019 Chennupati ........... H04W 60/00
2021/0126979 A1 * 4/2021 Ngo ........................ H04L 67/42

OTHER PUBLICATIONS

PCT Application No. PCT/US2021/043393 International Search Report and Written Opinion dated Aug. 17, 2021.

* cited by examiner

*Primary Examiner* — Nizar N Sivji
(74) *Attorney, Agent, or Firm* — Polsinelli LLP

(57) ABSTRACT

A router of a private cellular network is configured to receive data packets from a plurality of endpoints; analyze the data packets to determine a corresponding source of each data packet; determine whether each corresponding source is a valid source; drop a data packet for which the corresponding source is invalid; for a data packet received from a valid source, determine whether to process the data packet internally or forward the data packet for external processing and route the data packet to a corresponding destination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

20 Claims, 8 Drawing Sheets

SYSTEMS AND METHODS FOR MONITORING AND MANAGING NETWORK TRAFFIC IN A PRIVATE CELLULAR NETWORK

BACKGROUND

Field of the Disclosure

The present disclosure relates to operation of a private cellular network and more specifically to use of proxy routers in monitoring and steering traffic within the private cellular network that originate from both home and roaming devices connected to the private cellular network.

Description of the Related Art

Various generations of wireless technologies and supporting networks have been designed, standardized, implemented and used globally to service millions/billions of end users. These wireless networks have evolved from analog to digital radio access systems, from circuit switching to packet core, from proprietary mobility and administrative protocols to standardized protocols, and from single provider to multi provider networks.

Wireless connectivity through cellular networks provides several advantages over wireless connectivity through Wi-Fi, such as faster speed, security and longer coverage range to name a few. As wireless technologies evolve and connectivity capabilities of mobile devices and Internet of Things (IoT) devices increase, many established and large cellular wireless service providers (mobile network operators) are unable to meet the increased demand. Use of private cellular networks in areas and locations where providing wireless services are impossible or economically not feasible for the larger cellular wireless service providers, can address the gap to meet the increased demand.

SUMMARY

One or more example embodiments of inventive concepts are directed to private cellular networks that provide cellular connectivity in a confined geographical area to both home endpoints as well as guest endpoints utilizing the private cellular network (which may be referred to as roaming or visiting endpoints). More specifically, example embodiments are directed to specially configured routers of such private cellular networks that operate as proxies for directing incoming traffic (from both home and guest endpoints) and routing them to either the core components of the private cellular networks and or external network sources such as the core components of the home network(s) of the guest endpoints, an emergency service provider, etc.

One aspect of the present disclosure is a router of a private cellular network configured to manage network traffic on the private cellular network. The router includes at least one memory having computer-readable instructions stored therein and one or more processors. The one or more processors configured to execute the computer-readable instructions to receive data packets from a plurality of endpoints, each of which may be associated with one of a plurality of home cellular networks; analyze the data packets to determine a corresponding source of each of the data packets; determine whether the corresponding source of each of the data packets is a valid source, wherein the valid source is one of (1) a home endpoint for which the private cellular network is configured to serve as a primary service provider or (2) a guest endpoint for one of the plurality of home cellular networks is configured to server as a corresponding primary service provider and the private cellular network is configured to serve as a secondary service provider, the guest endpoint permitted to utilize services of the private cellular network, the services including voice and data communication services; drop a data packet for which the corresponding source is invalid; for a data packet received from a valid source, determine whether to process the data packet internally or forward the data packet for external processing, to yield a determination; and route the data packet to a corresponding destination based on the determination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

In another aspect, the one or more processors are configured to execute the computer-readable instructions to determine whether to process the data packet internally or forward the data packet for external processing based on the corresponding source of the received data packet.

In another aspect, wherein if the corresponding source is the home endpoint, the one or more processors are configured to execute the computer-readable instructions to route the data packet to the local enterprise network for processing.

In another aspect, if the corresponding source is the guest endpoint, the one or more processors are configured to execute the computer-readable instructions to route the data packet to a corresponding home cellular network of the guest endpoint for processing.

In another aspect, the one or more processors are configured to execute the computer-readable instructions to identify an evolved packet core of the corresponding home cellular network for routing the data packet to.

In another aspect, the one or more processors are configured to execute the computer-readable instructions to identify the evolved packet core based on a device type of the corresponding source of the data packet.

In another aspect, the device type indicates a priority level of the corresponding source within the home cellular network.

In another aspect, the one or more processors are configured to execute the computer-readable instructions to forward the data packet to an emergency service for processing, if the data packet is a request for an emergency assistance.

In another aspect, the one or more processors are configured to execute the computer-readable instructions to route the packet to an IP Multimedia Services (IMS) of the home cellular network for processing when the data packet is an IMS request.

In another aspect, the router is communicatively coupled to a backend cloud component of the private cellular network for routing the data packet for external processing.

One aspect of the present disclosure is a system for a private cellular network that includes a router with at least one memory having computer-readable instructions stored therein and one or more processors. The one or more processors are configured to execute the computer-readable instructions to receive data packets from a plurality of endpoints, each of which may be associated with one of a plurality of home cellular networks; analyze the data packets to determine a corresponding source of each of the data packets; determine whether the corresponding source of each of the data packets is a valid source, wherein the valid source is one of (1) a home endpoint for which the private cellular network is configured to serve as a primary service provider or (2) a guest endpoint for one of the plurality of home cellular networks is configured to server as a corresponding primary service provider and the private cellular network is configured to serve as a secondary service provider, the guest endpoint permitted to utilize services of the private cellular network, the services including voice and data communication services; drop a data packet for which the corresponding source is invalid; for a data packet received from a valid source, determine whether to process the data packet internally or forward the data packet for external processing, to yield a determination; and route the data packet to a corresponding destination based on the determination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

In another aspect, the system further includes a local core component and a cloud component. The local core components and the cloud component are configured to provide cellular wireless services to the home endpoint.

In one aspect, one or more non-transitory computer-readable media includes computer-readable instructions, which when executed by one or more processors of a router of a private cellular network, cause the router to receive data packets from a plurality of endpoints, each of which may be associated with one of a plurality of home cellular networks; analyze the data packets to determine a corresponding source of each of the data packets; determine whether the corresponding source of each of the data packets is a valid source, wherein the valid source is one of (1) a home endpoint for which the private cellular network is configured to serve as a primary service provider or (2) a guest endpoint for one of the plurality of home cellular networks is configured to server as a corresponding primary service provider and the private cellular network is configured to serve as a secondary service provider, the guest endpoint permitted to utilize services of the private cellular network, the services including voice and data communication services; drop a data packet for which the corresponding source is invalid; for a data packet received from a valid source, determine whether to process the data packet internally or forward the data packet for external processing, to yield a determination; and route the data packet to a corresponding destination based on the determination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

In one aspect, a method of managing network traffic in a private cellular network includes receiving data packets from a plurality of endpoints, each of which may be associated with one of a plurality of home cellular networks; analyzing the data packets to determine a corresponding source of each of the data packets; determining whether the corresponding source of each of the data packets is a valid source, wherein the valid source is one of (1) a home endpoint for which the private cellular network is configured to server as a primary service provider or (2) a guest endpoint for one of the plurality of home cellular networks is configured to serve as a corresponding primary service provider and the private cellular network is configured to server as a secondary service provider, the guest endpoint permitted to utilize services of the private cellular network, the services including voice and data communication services; dropping a data packet for which the corresponding source is invalid; for a data packet received from a valid source, determining whether to process the data packet internally or forward the data packet for external processing, to yield a determination; and routing the data packet to a corresponding destination based on the determination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
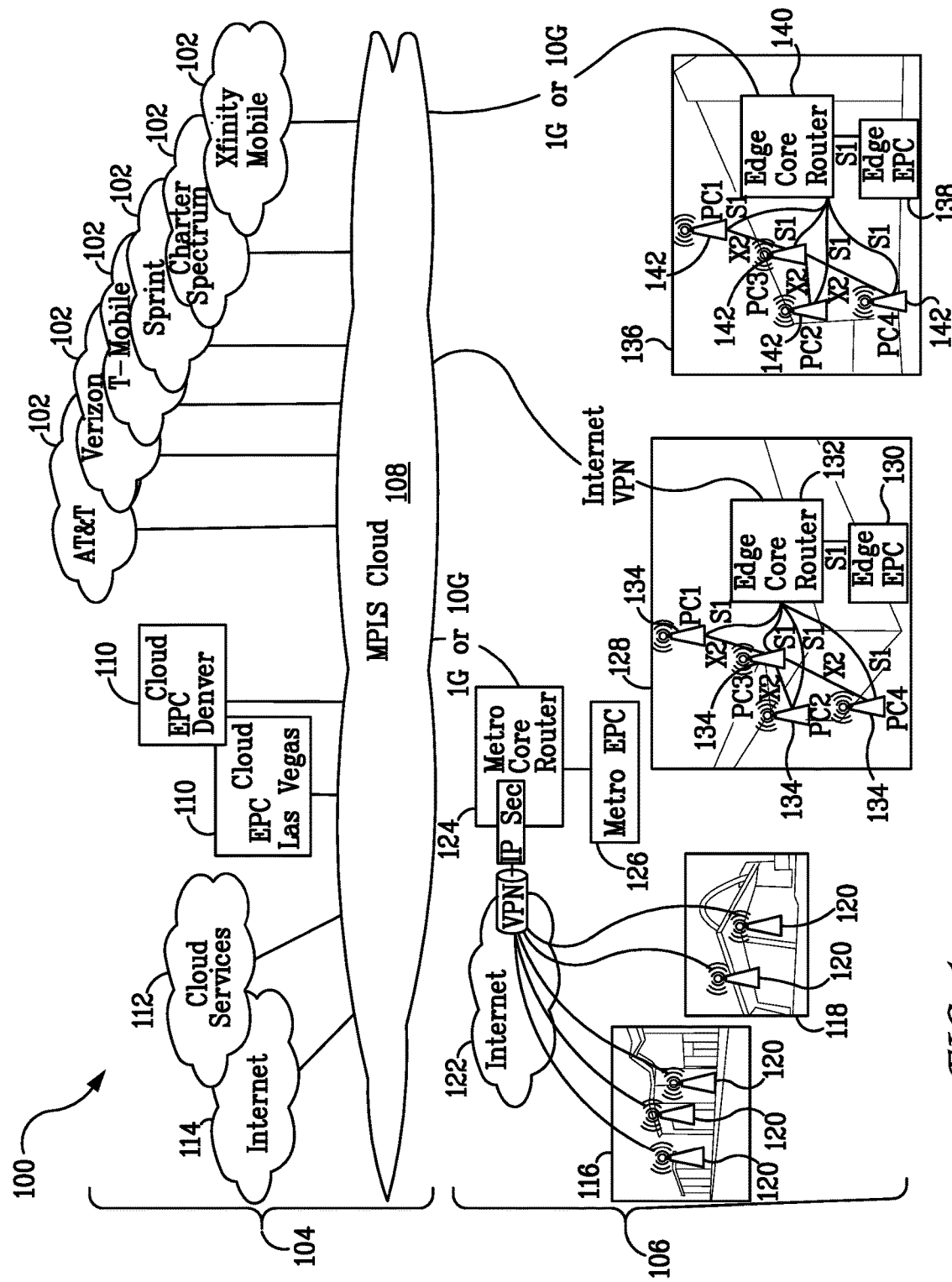
FIG. 1 illustrates an overview of a private cellular network ecosystem, according to an aspect of the present disclosure.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

A private cellular network within the context of the present disclosure is an ecosystem comprised of a backend component (a cloud component) and a site component. A site component may be comprised of specially configured hardware components installed at a site to provide cellular network (voice and data) connectivity to endpoints connected thereto.

A site component can be comprised of a number (e.g., ranging from single digit numbers to hundreds or thousands) of radio access components (e.g., small cell radio components that provide network connectivity such as LTE small cells, 5G access nodes, etc.) that are deployed over a limited geographical area (e.g., a building, a factory floor, a neighborhood, a shopping mall, etc.) and operate over a spectrum available for private use. The site component further includes known or to be developed radio equipment such as routers and core network components (Evolved Packet Core (EPC) components). EPC components can be 4G/LTE EPC components and/or 5G EPC components/functionalities.

For example, 4G/LTE EPC components include, but are not limited to, a Serving GPRS Support Node (SGSN), Gateway GPRS Support Node (GPRS) Mobile Switching Center (MSC), a Mobility Management Entity (MME), Home Subscriber Server (HHS), a Serving Gateway (S-GW), a Packet Data Network Gateway (PDN-GW), a Policy & Charging Rules Function (PCRF).

In another example, 5G EPC components include, but are not limited to, a Authentication Server Function (AUSF), a Core Access and Mobility Management Function (AMF), a Data network (DN), a Structured Data Storage network function (SDSF), an Unstructured Data Storage network function (UDSF), a Network Exposure Function (NEF), a NF Repository Function (NRF), a Policy Control function (PCF), a Session Management Function (SMF), a Unified Data Management (UDM), a User plane Function (UPF), an Application Function (AF), etc. Components of a 5G core can be referred to as functionalities as most are software based and can be adapted according to need and use case.

The site component can also include IP Multimedia Subsystem (IMS) for delivering IP multimedia services such as Voice over LTE (Vo-LTE) through IMS core. IMS core can handle IMS functionalities including, but not limited to, subscriber management, session setup and policy and charging enforcement, maintaining Quality of Service (QoS) and seamless interfacing between IMS Application Servers and the EPC.

The backend (cloud) component may provide one or more EPC functionalities (e.g., HSS services), manage interfacing and communication of the private cellular network with MNOs, allow mobility among users of the private cellular network by enabling them to move between multiple site components and still access their home site component, etc. Services provided by the backend component may be shared by/segmented for use by multiple private cellular networks that function independently as they may have been deployed at different sites and operated by different/independent enterprises. Additionally, the backend component may include networking and management tools (Network as a Service (NaaS)) built and deployed over network components (e.g., NaaS developed by Geoverse LLC of Seattle, Wash.) that are trusted by operators of the private cellular networks and various mobile network operators (MNOs) that, as will be described below, have suboptimal coverage in these confined geographical locations and thus have their endpoints and subscribers roam on such private cellular networks.

Such ecosystems, as described above, offer a fully interconnected private cellular network with a number of significant advantages to enterprises and MNOs. These ecosystems are flexible and scalable and eliminate costs and complexities associated with enterprises having to develop their own private network capabilities and/or costs and complexities associated with MNOs having to expand their network infrastructure and services to provide cellular connectivity to their subscribers and endpoints.

A fully integrated ecosystem described above provides premium connectivity services to both home and guest (roaming) devices coupled with various analytical features such as end user experience, service usages, indoor location determination and indoor mapping as well as capacity monetization including, but not limited to, potential sale of excess capacity to mobile operators and others.

Premium connectivity services include, but are not limited to, Subscriber Identity Module (SIM) subscriptions, shared data bundles, private cellular (LTE) voice, edge computing capabilities, etc. home and guest (roaming) devices include, but are not limited to, bridges, gateways, modems, push-to-talk devices, smartphones, tablets, laptops, Internet of Things (IoT) devices such as facility management devices, HVAC control devices, security monitoring devices, point of sale devices, sensors for maintenance, asset tracking, etc., robotics and autonomous vehicles, etc.

Cellular connectivity and services may be provided to guest devices by the private cellular network where the cellular connectivity services of the devices' home networks may be sub-optimal/less than a threshold level of service. Such threshold level of service may be a configurable parameter determined based on experiments and/or empirical studies. For example, when cellular data services offered by a home network is less than a threshold download/upload speed (in mbps) or such services of slower than same services provided by private cellular network by more than a threshold percentage (e.g., slower by more than 5%, 10%, 20%, etc.), private cellular network may be utilized to provide better cellular voice and data services to end users and thus improve end user experience. In addition to download/upload speed, other examples of such thresholds include signal strength (received signal strength indicator), signal quality measurement(s), etc.

FIG. 1 illustrates an overview of a private cellular network ecosystem, according to an aspect of the present disclosure. In ecosystem 100, one or more Mobile Network Operators (MNOs) 102 may interface with private cellular network of the present disclosure, which is comprised of a cloud based backend component 104 and site component 106.

MNOs 102 may include, but are not limited to, known operators of cellular networks such as AT&T®, Verizon®, T-Mobile®, Sprint®, Charter Spectrum®, Xfinity Mobile®, Vodafone® and/or any other known or to be established MNO. In one example, MNOs 102 may have a number of subscribers that may visit site component 106, in which the corresponding MNO(s) may not have sufficient wireless coverage and services available to their subscribers. As will be described below, these subscribers may roam on private cellular network at site component 106 when a roaming agreement is in place and is active between provider of the private cellular network at a site and roaming subscribers' respective MNOs.

Use of the private cellular network described in the present application is not limited to MNO subscribers with home MNOs having an active roaming arrangement in place with the provider of the private cellular network. For example, the private cellular network may be accessed by any mobile device having a dual-SIM capabilities with one SIM card being registered with their home MNO (cellular service provider) and another SIM card registered with the private cellular network. Another example use of private cellular network may be as part of a Multi-Operator Core Network (MOCN) structure, where one or more MNOs and private cellular network of the present disclosure may share the network infrastructure (e.g., edge or metro core router, as will be described below) of the private cellular network for servicing their subscribers.

Backend component 104 may include, but is not limited to, Multi-Protocol Label Switching (MPLS) cloud 108 on which one or more EPCs 110 of the private cellular network (e.g., located in different physical locations/cities) are accessible. Various known, or to be developed, cloud services 112 as well as the Internet 114 are also accessible via cloud 108.

Site component 106 of FIG. 1 includes two non-limiting examples of a metro site and an edge site. As noted above, a site component may include specially configured hardware components that provide network connectivity (cellular voice and data) to connected endpoints.

A metro site component may be deployed in a metropolitan area such that the private cellular network can encompass several/independent confined geographical areas such as a shopping mall comprised of multiple independent stores and locations, one or more blocks of a city, an entire university campus, etc. In FIG. 1, an example metro site is comprised of sites 116 and 118. Example site 116 can be an open air strip mall while example site 118 can be a closed building such as shopping mall. Access points 120 may be installed throughout sites 116 and 118 and communicate via Internet 122 (e.g., over known or to be developed Virtual Private Network (VPN) and IP security (IPSec) connections and protocols) with a private cellular edge formed of a metro core router 124 and a metro EPC 126. Metro core router 124 may be connected to MPLS cloud 108 and cloud backend component 104 via any known or to be developed wired and/or wireless connection (e.g., a 1G or a 10G connection).

An edge site component may be deployed in a single location providing cellular connectivity to users of and roamers associated with a single entity (e.g., a single corporation or business entity) and covers a confined geographical area that is smaller and more limited compared to a metro site. Another distinction between an edge site component and a metro site component is that each edge site is equipped with a dedicated edge core router and edge EPC (serving a single entity or enterprise network of a corporation, etc.) while several components of a metro site component may be shared by connected endpoints of several different entities as they share the same metro core router and metro EPC as described above.

Example edge sites component 128 of FIG. 1 may be at a factory site with a dedicated edge core router 130 and a dedicated edge EPC 132. Edge site component 128 may also have one or more access points 134 installed throughout the site and communicatively connected to edge core router 130 and edge EPC 132.

Example edge site component 136 may be a building with a dedicated edge core router 138 and a dedicated edge EPC 140. Edge site component 136 may also have one or more access points 142 installed throughout the site and communicatively connected to edge core router 138 and edge EPC 140.

Each of edge core routers 130 and 138 may be communicatively connected to MPLS cloud 108 and cloud backend component 104 via known or to be developed connections such as a VPN connection, a wired 1G/10G connection, etc.

Edge core routers 130, 138 a metro core router 124 may also be referred to as proxy routers.

Figure 2:
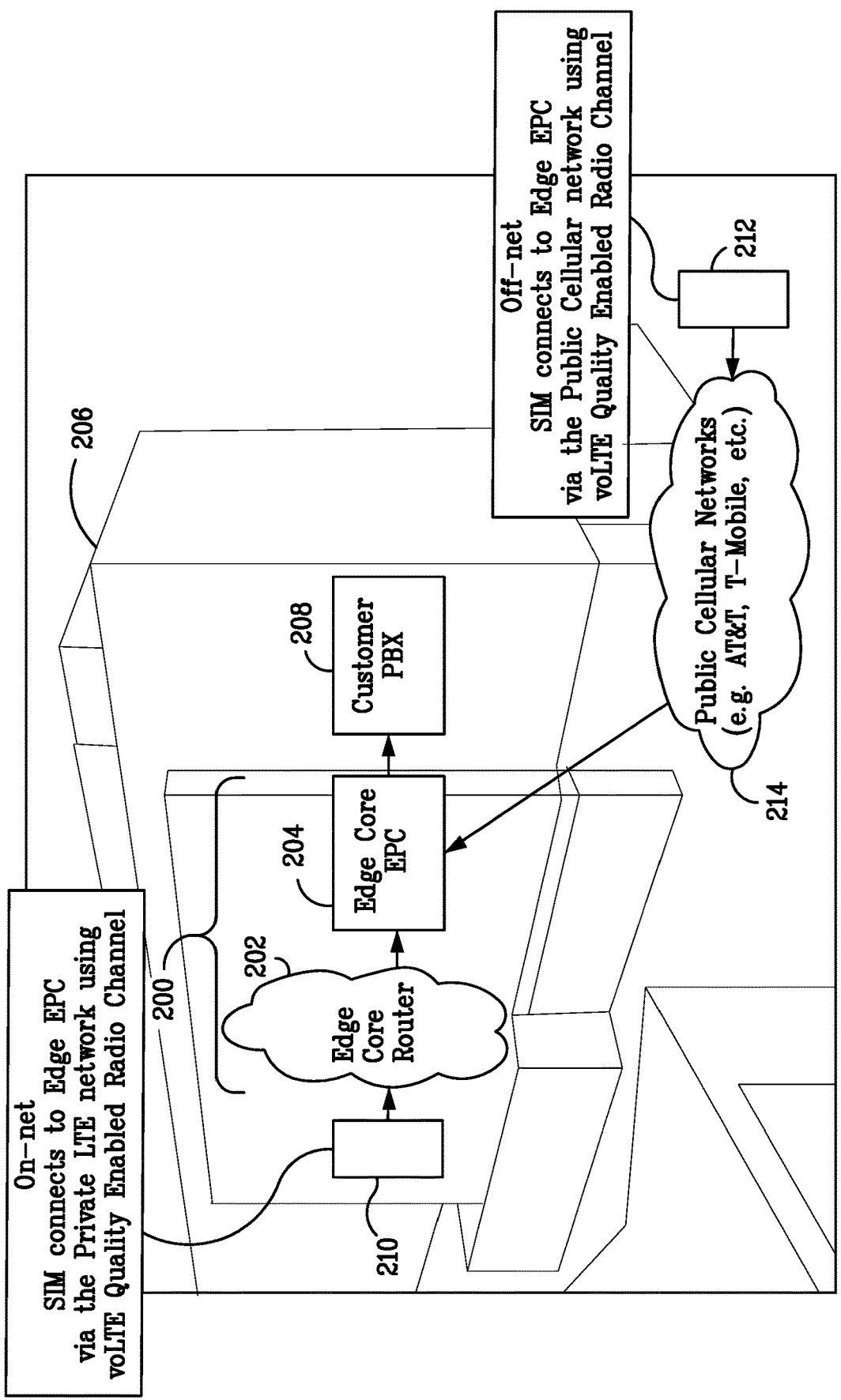
FIG. 2 illustrates an overview of an edge site component of a private cellular network deployed at an edge site, according to an aspect of the present disclosure.

FIG. 2 illustrates an overview of an edge site component of a private cellular network deployed at an edge site, according to an aspect of the present disclosure. Edge site component 200 of FIG. 2 may be the same as edge site component 136 of FIG. 1 with a dedicated edge core router 202 and a dedicated edge EPC 204 that may be the same as dedicated edge core router 138 and edge EPC 140, respectively. An enterprise network may be deployed in a building (edge site/customer site) 206 or a portion thereof occupied by an organization, entity, etc., Such enterprise network may be coupled to edge site component 200 so that edge site component 200 can provide private cellular network connectivity to endpoint devices of the enterprise network and/or any one or more external devices (not registered or part of enterprise network) present at edge site 206 and for which their corresponding MNO has an agreement in place with operator of edge site component 200 or otherwise is considered a valid UE/data source as described above and will be described further below.

The enterprise network may have one or more enterprise specific endpoints such as Private Branch Exchange (PBX) devices 208. PBX devices 208 may form a private telephone network of an organization associated with the enterprise network at edge site 200. Other examples of enterprise specific endpoints include, but are not limited to, mobile device 210, one or IoT devices (not shown), tablets, laptops, desktops, switches, routers, etc. (not show).

In example of FIG. 2, mobile device 210 may be a device registered with the enterprise network and the private cellular network provider. Accordingly, mobile device 210 may be provided with a SIM card registered with the private cellular network provided via edge site component 200. Mobile device 210 may be referred to as home mobile device 210 for which the private cellular network deployed at edge site 200 serves as the primary cellular service provider. Accordingly, mobile device 210 may connect to edge core router 202 and subsequently to the rest of the private cellular network to receive voice (e.g., LTE/5G quality voice (VoLTE)) and cellular data services. Furthermore, any one or more roaming/guest devices may roam on the private cellular network provided via edge site component 200, as will be described above. Such roaming/guest devices may not have a SIM card registered with private cellular network provided by edge site component 200 and instead may be registered with one or more of MNOs described above with reference to FIG. 1, serving as corresponding home cellular network providers of the roaming/guest devices.

Also, shown in FIG. 2 is an example of another home mobile device 212 that is registered with the private cellular network deployed via edge site component 200. However, mobile device 212 may be located outside building/site 206 such that mobile device 212 no longer falls within footprint/coverage area of the deployed private cellular network. Mobile device 212 can fall within the footprint of a cellular base 214 (e.g., LTE base station, eNode-B, etc.) of an MNO, examples of which are described above with reference to FIG. 1. Mobile device 212 can then connect to cellular base 214 and to edge EPC 204 to receive cellular voice and data services.

Figure 3:
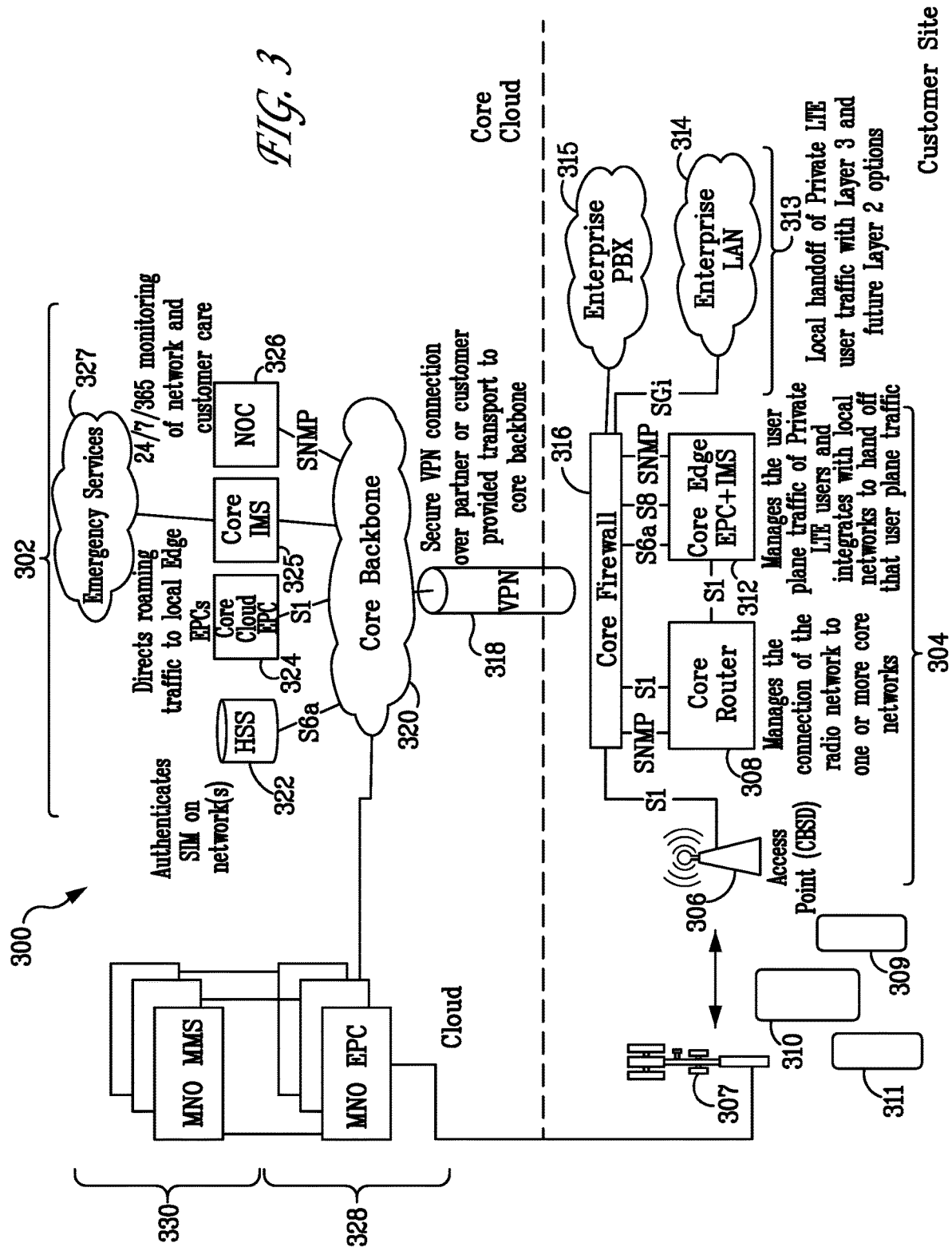
FIG. 3 illustrates details of cloud and site components of ecosystem of a private cellular network, according to an aspect of the present disclosure.

FIG. 3 illustrates details of cloud and site components of ecosystem of a private cellular network, according to an aspect of the present disclosure. As described above with reference to FIGS. 1 and 2 as well, ecosystem 300 is comprised of backend component 302 and site component 304, which may be the same as backend component 104 and site component 106 of FIG. 1, respectively. Backend component (cloud component) 302 and site component 304 may form a private cellular network configured to provide cellular voice and data services to one or more home devices of an enterprise network (at a customer site) that is communicatively coupled to site component 304.

In addition to backend component 302 and site component 304, FIG. 3 also illustrates, in general, components of MNOs and an example enterprise network communicatively coupled to cloud component 302 and site component 304, respectively, and will be further described below.

Site component 304 may have one or more access points 306 (e.g., a Citizens Broadband Radio Service (CBRS) access point) coupled to an edge core router 308, all of which may be deployed at a customer site, which can be the same as edge site 206 of FIG. 2.

Edge core router 308, as will be described below, is a specially configured router for managing network traffic (inbound and outbound) to and from connected endpoints such as endpoints 309, 310 and 311 (each of which may also be referred to as a user equipment (UE)). A number of UEs connected to private cellular network at the customer site is not limited to 3 and can be more or less.

UEs 309, 310 and 311 can be any one of, but not limited to, a mobile device, a tablet, a laptop, an Internet of Things (IoT), a sensor, etc. In other words, UEs 309, 310 and 311 can be any device capable of establishing a wireless/cellular connection to nearby device.

As will be further described below, any number of UEs may be registered with enterprise network 313. Furthermore, one or more of UEs 309, 310 and 311 may be roaming devices that are not registered with enterprise network 313 but instead are associated with MNOs that have roaming agreements in place with provider of private cellular network at the customer site and hence are allowed to roam on the private cellular network.

One or more of UEs 309, 310 or 311 may also be a dual-SIM device registered with both a home MNO and private cellular network without the MNO necessarily having a roaming arrangement in place with the private cellular network. In another example, any one or more of UEs 309, 310 or 311 may be a subscriber of an MNO being part of a MOCN with private cellular network of the present disclosure. All such UEs may be considered valid UEs (which may also be referred to as a valid source of a data packet) that may access private cellular network of the present disclosure and have core router of the private cellular network service (route) their respective inbound/outbound voice and data traffic.

Accordingly and while example embodiments are primarily described with reference to a roaming UE with a home MNO that has an active roaming agreement in place with the provider of private cellular network of the present application, as an example of a valid UE, the present disclosure is not limited thereto. A valid UE may also be a dual-SIM UE or a UE of a subscriber with an MNO that is part of a MOCN with the private cellular network. Similarly, the present disclosure may frequently refer to services provided by the private cellular network and edge core router 308 to a valid UE as roaming services. Such services are not limited to roaming services commonly referred to in the relevant art but may also include secondary/auxiliary LTE services. Accordingly, services provided by private cellular network of the present disclosure may be referred to as complimentary (and/or secondary or auxiliary) cellular services.

Edge core router 308 may be coupled to edge EPC 312 (e.g., via a S1 LTE connection shown in FIG. 3). In example of FIG. 3, edge EPC 312 also provides IMS services described above. Edge EPC 312 may be configured to manage user plane traffic of private cellular users (e.g., user equipment and connected endpoints of enterprise network 313 for which the private cellular network serves as a home cellular service provider). Edge EPC 312 may interface with enterprise Local Area Network (LAN) 314 to handoff user plane traffic to enterprise network 313 (with layer 3/layer 2 option). An example connection between edge EPC 312 and enterprise network 313 may be via a SGi interface/connection as shown in FIG. 3. Enterprise network 313 may include enterprise equipment and devices such as enterprise LAN 314 and enterprise PBX 315 described above.

Site component 304 may further include a firewall 316 that interfaces with access point 306, edge core 308, edge EPC 312, with access point 306 and components of enterprise network 313. As shown in FIG. 3, firewall 316 may interface with access point 306 via a dedicated S1 interface. Firewall 316 may interface with edge core router 308 via another dedicated S1 connection and Simple Network Management Protocol (SNMP) protocol. Firewall 316 may interface with edge EPC 312 via S6a and S8 connections and Simple Network Management Protocol (SNMP). Furthermore, firewall 316 may be connected to enterprise LAN 314 via a SGi connection.

Backend component 302 may be communicatively connected to site component 304 via any known or to be developed secure communication medium such as a secure VPN connection 318.

Backend component 302 may include a backbone 320 and communicatively coupled to one or more cloud based servers (may be geographically distributed) and may be proprietary or provided via third party providers of private/public/ hybrid cloud infrastructure. Any one or more of such cloud based servers may be a HSS server 322 configured to authenticate SIM cards associated with the private cellular network (e.g., a SIM card activate in UE 310) and/or a SIM card of an MNO with an associated UE roaming on the private cellular network at the customer site shown in FIG. 3 and similarly described in FIG. 2. Another one of such servers may be a cloud EPC 324. Cloud EPC 324 may function to direct home traffic originating from one site component such as site component 304 to another site component of the same private cellular network. For example, an organization may have offices in multiple cities, all of which may be operating on enterprise network 313. Site component 304 of the private cellular network may be deployed at each one of the multiple offices. Accordingly, local cellular traffic from one site component 304 at one of the offices may be directed to the private cellular network deployed at another office via cloud EPC 324.

Backend component 302 may also include an IP Multimedia Service (IMS) 325 for communicating/processing requests for IMS services to appropriate IMS processing components of home networks. IMS 325 may also process/forward requests for emergency services (e.g., 911 services) to appropriate providers of such services such as emergency services 327.

Backend component 302 may further include an additional server 326 that may be referred to as Network Operation Center (NOC) 326 configured to manage operation of the private cellular network ecosystem and provide NaaS services described above and services such as network monitoring, customer service, etc.

Backbone 320 may be communicatively coupled to HSS 322 via a S6a connection, to cloud EPC 324 via an S1 interface, to IMS 325 via any known or to be developed communication scheme/protocol and to NOC 326 via an SNMP protocol.

As also shown in FIG. 3, backbone 320 may be connected/communicatively coupled to multiple MNOs. FIG. 3 illustrates an example of three different MNOs, each of which has a corresponding MNO EPC from among the three examples of MNO EPCs 328. Each MNO EPC from MNO EPCs 328 may optionally have a corresponding MNO IMS from among MNO IMSs 330 shown in FIG. 3. Alternatively, multiple MNO EPCs 328 may share a common MNO IMS 330. A combination of one MNO EPC 328 and one MNO IMS 330 may be referred to as an MNO.

Furthermore, each MNO EPC 328 may be communicatively coupled to a cell tower such as cell tower 307. While FIG. 3 illustrates a single cell tower 307, each MNO may have a separate cell tower similar to cell tower 307 to which it is communicatively coupled. In the non-limiting example of FIG. 3, a single tower 307 may be shared by all MNOs formed by MNO EPCs 328 and MNO IMSs 330.

Cell tower 307 is intended to provide cellular and voice data coverage to one or more subscribers such as UEs 309, 310 and/or 311. However, for various reasons, such coverage may be limited or unavailable to UEs 309, 310 and/or 311. For example, coverage of a given MNO may be weak or otherwise not allowed inside the geographical location (customer site) in which the enterprise LAN 314 and the private cellular network is deployed, hence a corresponding one of UEs 309, 310 or 311 may be operating as a guest device on the private cellular network.

A given MNO comprised of one of MNO EPCs 328 and optionally one of MNO IMSs 330 may operate as home network of one or more UEs (e.g., UEs 309, 310 and 310) roaming on the private cellular network provided by backend component 302 and site component 304 at the customer site (e.g., because coverage of the home network within the site in which the private cellular network is deployed, may be suboptimal (less than a threshold coverage)). Connection between backbone 320 and MNO networks 328 may be via any known or to be developed communication link such as roaming links (S8 interface) and IPX connections.

With example overview and structure of a private cellular network described above with reference to FIGS. 1-3, one or more example processes will be described with reference to FIGS. 4-7 according to which a core router of a private cellular network deployed at a customer site (e.g., an edge site) monitors, manages and routes network traffic to in-network and out-network (e.g., home MNOs of roaming devices) destinations.

Figure 4:
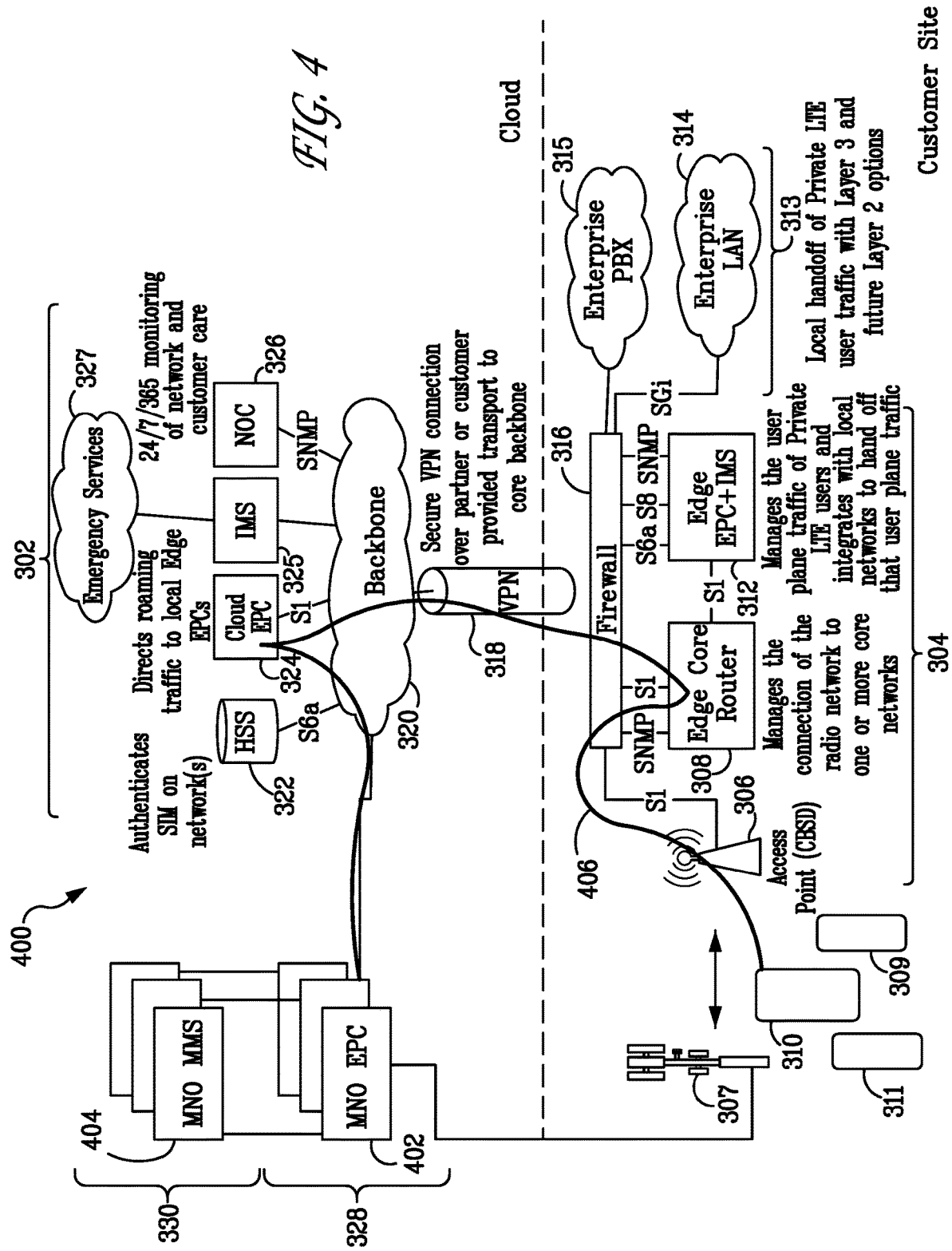
FIG. 4 is a visual representation of an example traffic routing via core router of a private cellular network, according to an aspect of the present disclosure.

FIG. 4 is a visual representation of an example traffic routing via core router of a private cellular network, according to an aspect of the present disclosure. Elements in FIG. 4 that are the same as their corresponding counterpart in FIG. 3 are numbered the same as in FIG. 3 and will not be further described for sake of brevity. For example, HSS 322 in FIG. 4 is the same as HSS 322 in FIG. 3 and will not be further described with reference to FIG. 4.

In ecosystem 400 of FIG. 4 and in comparison with FIG. 3, UE 310 may be a guest/roaming device that is roaming on/using services of private cellular network provided by backend component 302 and site component 304 at the customer site, as described above. Such guest UE 310 may be a subscriber of an MNO associated with one of MNO EPCs 328 and one of IMSs 330. Coverage of MNO 328 may be weak or otherwise not allowed inside the confined geographical location of the customer site in which the enterprise LAN 314 and the private cellular network is deployed, hence why UE 310 may be operating as a guest device on the private cellular network.

As shown in FIG. 4, an example cellular (e.g., LTE) data call may be originated from UE 310 that is routed first to edge core router 308. By examining header information associated with data packets received from the guest UE 310, edge core router 308 may determine that the data call is to be routed to one of MNO EPCs 328 of the home MNO of UE 310. In this particular example, it is assumed that MNO EPC 402 and MNO IMS 404 form the home MNO of UE 310. As will be described below, edge core router 308 determines that UE 310 is a valid source of the data call (e.g., home MNO of UE 310 has an active agreement in place with operator of private cellular network at the customer site) and thus routes the data packets to backend component 302 to be forwarded to appropriate one of MNO EPCs 328 (in this example MNO EPC 402). The routing of the packet is shown via line 406. As shown, after edge core router 308 identifies MNO EPC 402 as the destination for data call packets received from UE 310, the packets are routed to cloud EPC 324 via firewall 316, VPN connection 318 and backbone 320, where cloud EPC 324 routes the packets to MNO EPC 402. Given the active agreement between home MNO of UE 310 and the private cellular network, UE 310 may be considered a valid source of the received data packet.

In another example, UE 309 is also a guest device attempting to roam on private cellular network provided at site component 304. However, home MNO of UE 309 may not have a roaming agreement in place with operator of the private cellular network at the customer site or may have had a roaming agreement that is now expired. Accordingly and upon receiving a data packet from UE 309, edge core router 308 may determine that UE 309 does not have permission or is not authorized to use private cellular network at the customer site (for example, edge core router 308 may be provisioned with proper information for which UEs are valid or not such as UEs having MNOs with valid roaming agreement, dual-SIM UEs, UEs with MNOs utilizing a MOCN with private cellular network, as described above). Therefore, edge core router 308 may drop data packets received from UE 309. In this example and given no active roaming agreement between home MNO of UE 309 and the private cellular network, UE 309 may be considered an invalid source of the received data packet.

In another example, UE 311 may be a registered device of enterprise network 313, which is another example of a valid source/UE of the received data packet. Accordingly, when edge core router 308 receives a data packet from UE 311, edge core router 308 may send the data packet to enterprise LAN 314 to be forwarded to intended destination on enterprise network 313 (e.g., one of PBX devices of enterprise PBX 315). Furthermore, private cellular network at the customer site provides/extends cellular services (cellular voice and data services) to UE 311. Such cellular services may be LTE data service for UE 311 placing a video call to an external destination (outside enterprise network 313)

Figure 5:
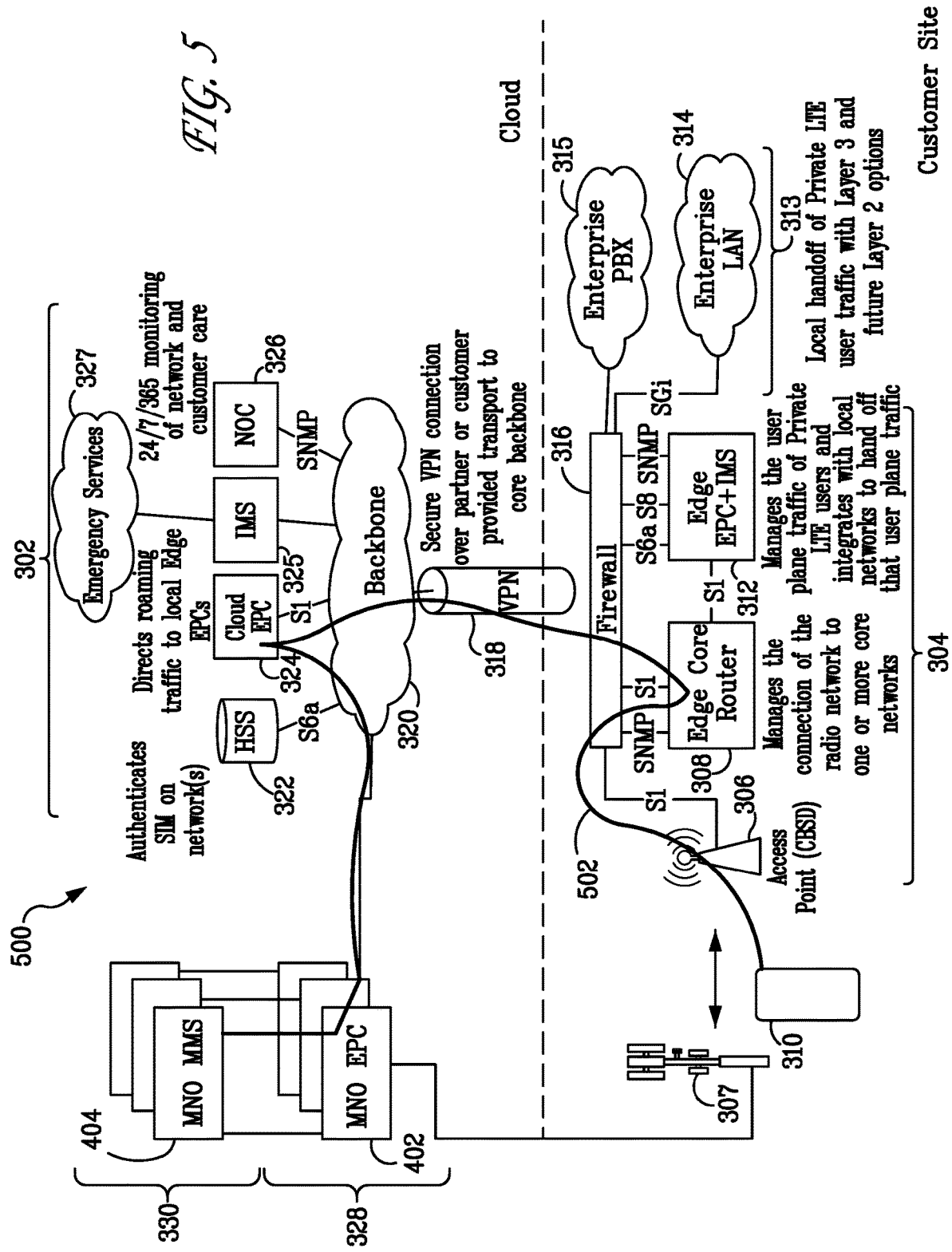
FIG. 5 is a visual representation of an example traffic routing via core router of a private cellular network, according to an aspect of the present disclosure.

FIG. 5 is a visual representation of an example traffic routing via core router of a private cellular network, according to an aspect of the present disclosure. Elements in FIG. 5 that are the same as their corresponding counterpart in FIGS. 3 and 4 are numbered the same as in FIGS. 3 and 4 and will not be further described for sake of brevity.

In describing FIG. 4, an example was described where a data packet is received at edge core router 308, from UE 310. In that example, it was assumed that UE 310 is a valid source of the data packet (e.g., home MNO of UE 310 has an active roaming agreement in place with private cellular network at the customer site). FIG. 5 describes a non-limiting example, where a data packet or a call received at edge core router 308 from UE 310 is an IMS request (e.g., an emergency VoLTE call) such that the data packet or the call should be routed to MNO IMS 404. This routing is shown by line 502.

In another example, a home MNO may have multiple dedicated EPCs and IMSs for different categories of endpoints and subscribers. For example, an MNO provider may have a dedicated/prioritized core network for first responders subscribed thereto. Such EPC may have high redundancy (high reliability) but less processing capabilities. In another example, an MNO provider may also have a dedicated/prioritized core network for designated groups of commercial subscribers that should be prioritized over non-commercial subscribers.

In another example, a given MNO may have multiple EPCs for different types of incoming data. For example, UE 310 may be an IoT device and thus processing of the transmitted data may not require high processing capacity. Accordingly, for data originating from IoTs, edge router 308 is configured to identify such origin and route it to a different EPC of home MNO of UE 310 than one to which data originating from a non-IoT UE (e.g., a mobile device) is forwarded.

In example of FIG. 5, UE 310 may be a prioritized commercial subscriber of its home MNO and/or may be associated with first responder group of its home MNO. Accordingly, by analyzing header of an emergency data packet received from UE 310, edge core router 308 routes the data packet to MNO EPC 404.

While FIG. 5 describes multiple different examples, each example is described in the context of receiving a data packet from a single UE. In another example, edge core router 308 may receive multiple data packets from multiple different UEs, some of which are from valid sources (having home MNOs with active agreements with private cellular network at customer site), some of which are invalid sources (having home MNOs with no active agreements with private cellular network at customer site) and some of which are devices associated with enterprise network 313 at customer site (also considered valid sources). Edge core router 308 is capable of simultaneously processing all received packets and (1) send each valid data packet to an EPC or IMS of a corresponding home MNO or to emergency services 327, (2) drop data packets from invalid sources and (3) forward data packets from sources associated with enterprise network 313 to enterprise LAN 314.

Figure 6:
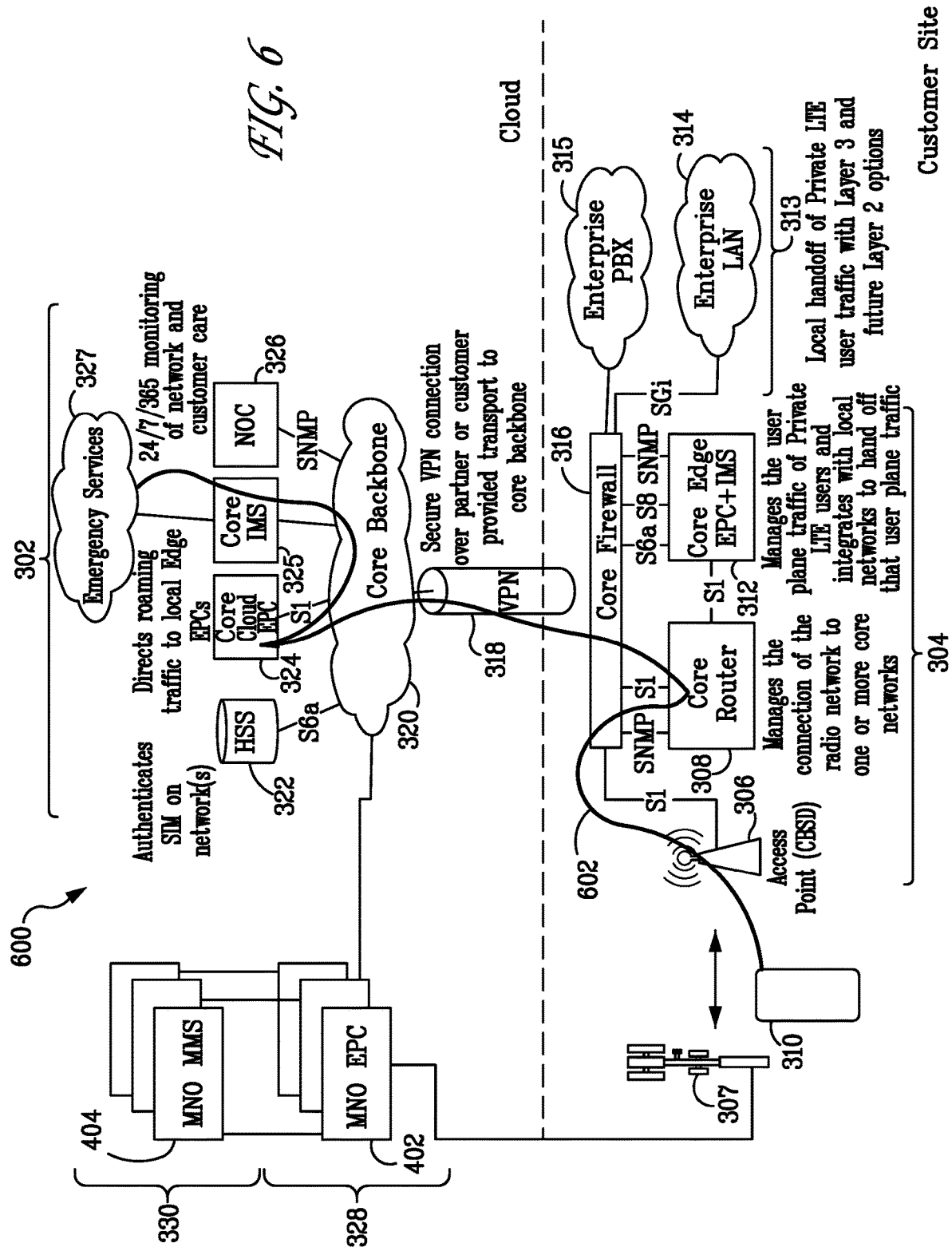
FIG. 6 is a visual representation of an example traffic routing via core router of a private cellular network, according to an aspect of the present disclosure.

FIG. 6 is a visual representation of an example traffic routing via core router of a private cellular network, according to an aspect of the present disclosure. Elements in FIG. 6 that are the same as their corresponding counterpart in FIGS. 3-5 are numbered the same as in FIG. 3-5 and will not be further described for sake of brevity.

In ecosystem 600 of FIG. 6, network traffic originating from guest UE 310 (assumed to be a subscriber of an MNO having an active roaming agreement with private cellular network at customer site) may be an emergency call (e.g., a 911 call for emergency assistance). In another example, such emergency call may be from a home UE such as UE 311 (not shown in FIG. 6), which should be similarly processed and forwarded to emergency services 327. By examining header information associated with data packets received from the guest UE 310, edge core router 308 may determine that the emergency call is to be routed to emergency services 327 (emergency services provider 327). The routing of the packet is shown via line 602. As shown, after edge core router 308 identifies emergency services 327 as the destination for voice call packets received from UE 310, the packets are routed to cloud EPC 324 via firewall 316, VPN connection 318 and backbone 320, where cloud EPC 324 routes the packets to IMS component 325 to be forwarded to emergency services 327 or more specifically to a call/control center of emergency services 327.

FIGS. 4-6 illustrates various non-limiting examples of a specialized edge core router 308 configured to execute computer-readable instructions to identify source and destination of incoming voice and data packets to route them to either home or external destinations (home MNO of a roaming device, emergency services, etc.).

The concepts described above with reference to FIGS. 4-6 can be equally carried out by a metro core router such as metro core router 124 of a metro site, as described with reference to FIG. 1.

Figure 7:
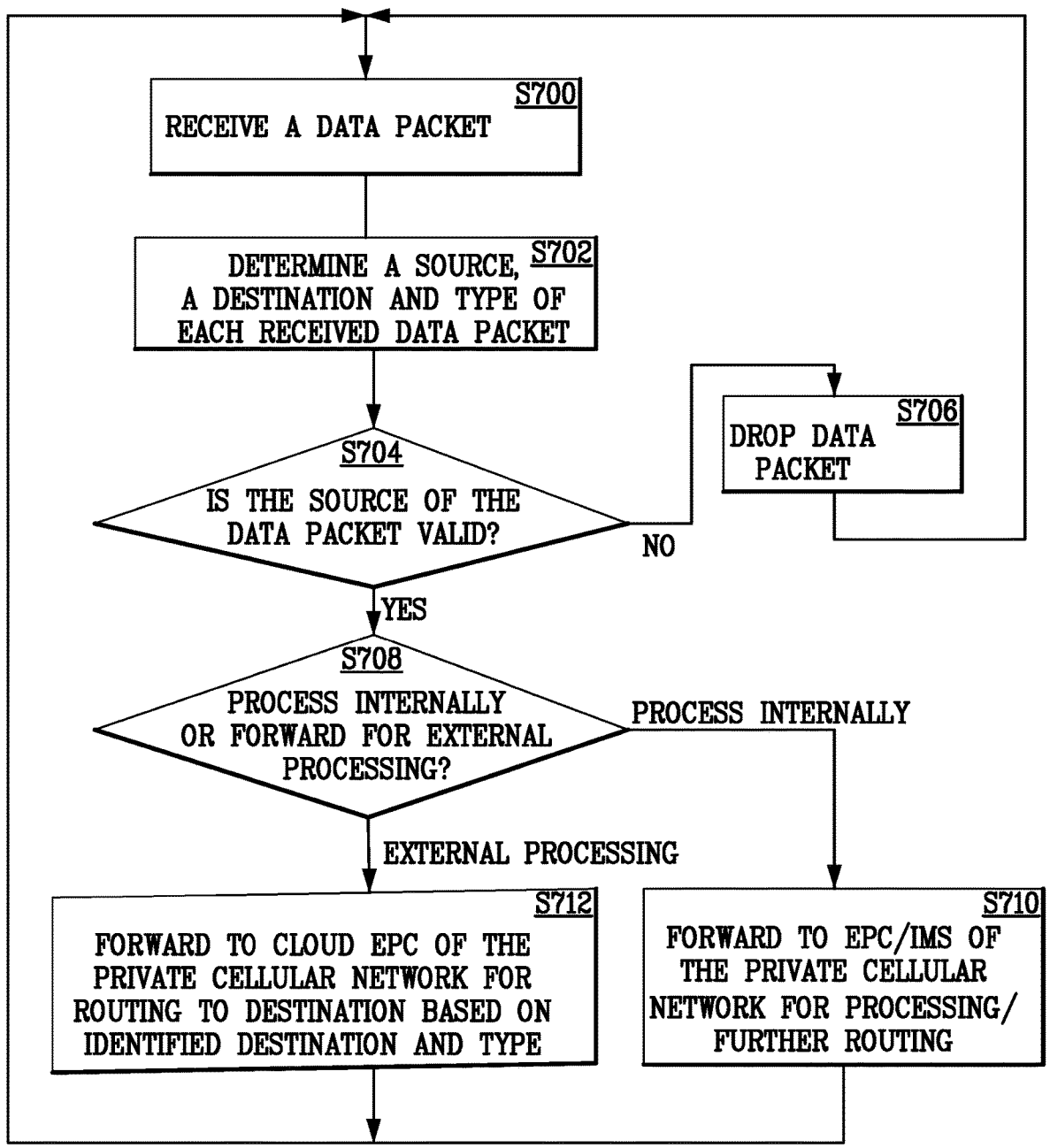
FIG. 7 illustrates a method of traffic management and routing by an edge router, according to an aspect of the present disclosure.

FIG. 7 illustrates a method of traffic management and routing by an edge router, according to an aspect of the present disclosure. FIG. 7 will be described with reference to FIGS. 3-6 and from the perspective of edge core router 308 but it should be appreciated that the same process can be carried out by metro core router 124. Edge core router 308 and/or metro core router 124 may be configured to execute computer-readable instructions stored on one or more associated memories to perform the steps of FIG. 7.

At S700, edge core router 308, which in combination with remaining elements of site component 304 and backend component 302 form a private cellular network deployed at the customer site of enterprise LAN 314, receives a data packet from a UE such as one of UEs 309, 310 and 311. Such UE may be a guest endpoint roaming on the private cellular network (e.g., a valid source/UE such as UE 310 described above), an invalid device/source such as UE 309 or may be a home device associated with enterprise LAN 314 (e.g., UE 311). The received data packet can be a cellular voice call, cellular data, a request for emergency services, etc. While FIGS. 4-6 illustrate non-limiting examples of a single UE or endpoint being connected to access point 306, in reality, a number of UEs and endpoints (e.g., tens, hundreds, thousands or more cellular capable devices and end points) may be connected to multiple access points such as access point 306, where one or more of the UEs are home devices for which the private cellular network is a home cellular service provider, one or more of the UEs are invalid sources and one or more of the UEs are valid devices/sources roaming on the private cellular network as guest devices and have one or more MNOs, as described above, serving as their primary or home cellular service provider. An example of a guest UE may be a UE of a vendor or a visitor to the site of an organization or entity at which the enterprise LAN 314 and the private cellular network are deployed.

At S702, edge core router 308 analyzes the received data packets to determine a corresponding source of each received data packet by examining packet header of the received data packet to determine a source ID and a corresponding destination for each of the received data packets by examining the received data packet to determine a destination ID and a type of each data packet.

At S704, edge core router determines if the source of the received data packet is a valid source/UE. As noted above, a source (e.g., a UE) of a received data packet can be any one of a UE of a home MNO having active roaming agreement with private cellular network the customer site a UE with a dual-SIM capabilities registered to both the private cellular network and a home MNO, a UE of a home MNO that is part of a MOCN with the private cellular network, an invalid UE (e.g., a UE of a home MNO with a non-existent or expired roaming activity with private cellular network at the customer site) or a UE that is part of enterprise network 313 at customer site, etc. As described above with reference to FIG. 5, edge router 308 can analyze the received data packet to determine if the source (e.g., a UE, an IoT, etc.) is valid source (e.g., associated with a home MNO that is part of an active roaming agreement with the private cellular network) or an invalid source (e.g., associated with a home MNO that does not have an active roaming agreement with the private cellular network) or is associated/registered with enterprise network 313.

If at S704, edge core router 308 determines that the source is invalid (associated with a home MNO without an active roaming agreement with private cellular network at customer site), at S706, edge core router 308 drops the received data packet and then the process reverts back to S700. In another example, instead of dropping the received data packet, edge core router 308 may send a reject message to the source UE and then the process reverts back to S700.

However, if at S704, edge core router 308 determines that the source is valid (a valid roaming device or a device associated with enterprise network 313), the process then proceeds to S708.

At S708, edge core router 308 determines (identifies), for each received data packet, whether the data packet is to be processed internally on the private cellular network or be routed for further processing to an external destination such as, but not limited to, a home MNO for a roaming device/UE from which the data packet is received such as MNO associated with MNO EPC 402 and MNO IMS 404, an emergency response service such as emergency services 327, etc. If the source ID of the data packet indicates that the source ID corresponds to a SIM card of a home device, edge core router 308 determines that the data packet is originated from a home UE such as UE 311 registered with enterprise network 313 and is to be processed internally.

If at S708, edge core router 308 determines that the data packet is home bound (to be processed internally), then at S710, edge core router 308 forwards (routes) the received data packet to edge EPC/IMS 312 based on destination ID and type of for further processing according to any known or to be developed method of processing, routing, responding to cellular voice and data requests made by home UE (e.g., UE 311). In other words, private cellular network can provide cellular voice and data services to UE 311 and/or forward the data packet to enterprise network 313 for processing.

However, if the source ID of the data packet is associated with a SIM card registered to a valid MNO (an MNO having an active agreement with private cellular network at customer site for roaming services), edge core router 308 determines that the data packet is originated from a guest UE such as UE 310 roaming on the private cellular network and is to be processed externally. In another example, if the data packet indicates a request for emergency services, edge core router 308 also determines such data packet as one to be processed externally and thus forwards the data packet to emergency services 327 as described above with reference to FIG. 6.

when at S708, edge core router 308 determines that the received data packet is to be processed externally, then at S712, edge core router 308, based on the destination ID and the type of the data packet determined at S702 (e.g., VoLTE, cellular data or an emergency call request), determines the external destination and forwards (routes) the data packet to cloud EPC 324 to be forwarded to the appropriate destination (e.g., MNO EPC 402, MNO IMS 404, emergency services 327, etc., as described above with reference to FIGS. 4-6). Alternatively, edge core router 308 forwards the received packet to cloud EPC 324 for determination of the type of request included in the packet. Such determination results in the packet being forwarded to the correct destination (e.g., MNO EPC 402, MNO IMS 404, emergency services 327, etc., as described above with reference to FIGS. 4-6).

In one example, exact destination for the data packet is determined based on a type of the data packet determined at S702. In one example, a type of the data packet may indicate that the UE from which the data packet is originated has a certain priority level (is part of a group of commercial subscribers, is part of a group of first responder customers, etc.) in the home MNO that should receive prioritized processing. Accordingly, the data packet is forwarded to a particular EPC of the home MNO that may be different than an EPC to which data requests of non-prioritized subscribers are processed.

In another example, the type of the data packet may indicate a request for emergency services, in response to which edge core router 308 forwards the data packet to emergency services 327 as described with reference to FIG. 6.

In another example, the type of the data packet may indicate an IMS request (e.g., VoLTE request or a video call). Accordingly, edge core router 308 may forward the data packet to an MNO IMS such as MNO IMS 404 described above (alternatively if the IMS request is from a prioritized subscriber, such IMS request may be forwarded to a particular MNO IMS dedicated to such group of prioritized subscribers).

Thereafter, the process may revert back to S700 and edge core router 308 may repeat the process continuously upon receipt of new data packet from access point 306.

With various examples of traffic management and routing at a core router of a private enterprise network deployed at a site described above, the disclosure now turns to description of several example system components and architectures that can be utilized to function as any one or more components of ecosystems described above such as edge core router 308, metro core router 124, etc.

Figure 8A:
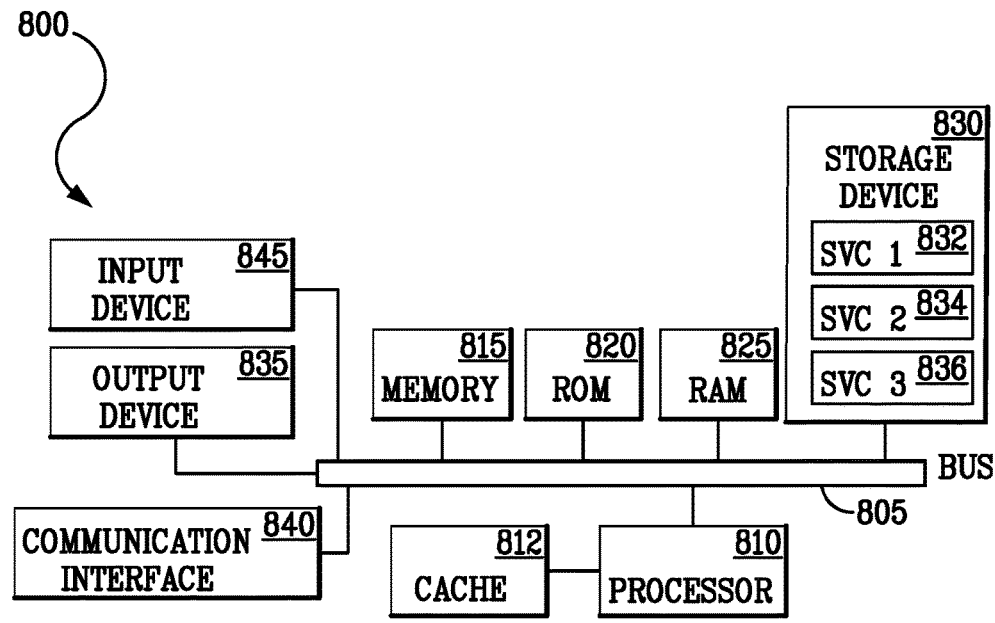
FIGS. 8A and 8B illustrate systems according to an aspect of the present disclosure.
Figure 8B:
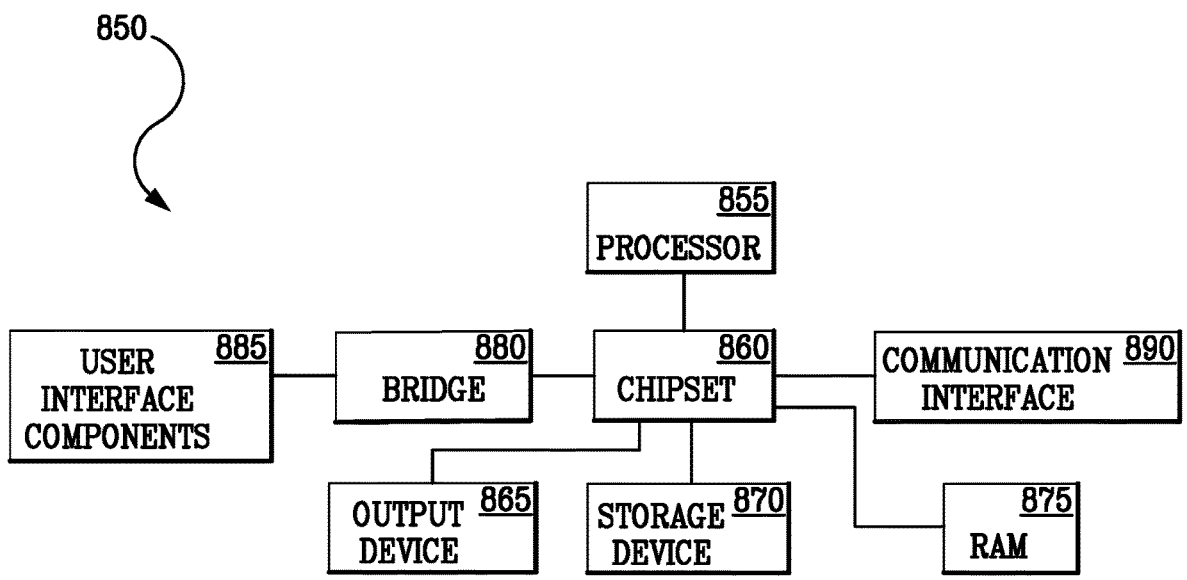

FIGS. 8A and 8B illustrate systems according to an aspect of the present disclosure. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 630 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as services (SVC) 1 832, SVC 2 834, and SVC 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software SVCs 832, 834, and 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A router of a private cellular network configured to manage network traffic on the private cellular network, the router comprising:
    at least one memory having computer-readable instructions stored therein; and
    one or more processors configured to execute the computer-readable instructions to:
        receive data packets from a plurality of endpoints, each of which may be associated with one of a plurality of home cellular networks;
        analyze the data packets to determine a corresponding source of each of the data packets;
        determine whether the corresponding source of each of the data packets is a valid source, wherein the valid source is one of (1) a home endpoint for which the private cellular network is configured to serve as a primary service provider or (2) a guest endpoint for one of the plurality of home cellular networks is configured to server as a corresponding primary service provider and the private cellular network is configured to serve as a secondary service provider, the guest endpoint permitted to utilize services of the private cellular network, the services including voice and data communication services;
        drop a data packet for which the corresponding source is invalid;
        for a data packet received from a valid source,
            determine whether to process the data packet internally or forward the data packet for external processing, to yield a determination; and
            route the data packet to a corresponding destination based on the determination, the corresponding destination being one of a local enterprise network or a corresponding home cellular network of the valid source from which the data packet is received, wherein
        the private cellular network is configured to service a confined physical location in which home cellular networks of data packets received from valid sources do not provide cellular connectivity that meets a threshold level of cellular service.

2. The router of claim 1, wherein the one or more processors are configured to execute the computer-readable instructions to determine whether to process the data packet internally or forward the data packet for external processing based on the corresponding source of the data packet received.

3. The router of claim 2, wherein if the corresponding source is the home endpoint, the one or more processors are configured to execute the computer-readable instructions to route the data packet to the local enterprise network for processing.

4. The router of claim 2, wherein if the corresponding source is the guest endpoint, the one or more processors are configured to execute the computer-readable instructions to route the data packet to a corresponding home cellular network of the guest endpoint for processing.

5. The router of claim 4, wherein the one or more processors are configured to execute the computer-readable instructions to identify an evolved packet core of the corresponding home cellular network for routing the data packet to.

6. The router of claim 5, wherein the one or more processors are configured to execute the computer-readable instructions to identify the evolved packet core based on a device type of the corresponding source of the data packet.

7. The router of claim 6, wherein the device type indicates a priority level of the corresponding source within the corresponding home cellular network.

8. The router of claim 1, wherein the one or more processors are configured to execute the computer-readable instructions to forward the data packet to an emergency service for processing, if the data packet is a request for an emergency assistance.

9. The router of claim 4, wherein the one or more processors are configured to execute the computer-readable instructions to route the data packet to an IP Multimedia Services (IMS) of the corresponding home cellular network for processing when the data packet is an IMS request.

10. The router of claim 1, wherein the router is communicatively coupled to a backend cloud component of the private cellular network for routing the data packet for external processing.

11. A system for a private cellular network comprising:

a router including at least one memory having computer-readable instructions stored therein and one or more processors configured to execute the computer-readable instructions to:

receive data packets from a plurality of endpoints, each of which may be associated with one of a plurality of home cellular networks;

analyze the data packets to determine a corresponding source of each of the data packets;

determine whether the corresponding source of each of the data packets is a valid source, wherein the valid source is one of (1) a home endpoint for which the private cellular network is configured to serve as a primary service provider or (2) a guest endpoint for one of the plurality of home cellular networks is configured to server as a corresponding primary service provider and the private cellular network is configured to serve as a secondary service provider, the guest endpoint permitted to utilize services of the private cellular network, the services including voice and data communication services;

drop a data packet for which the corresponding source is invalid;

for a data packet received from a valid source, determine whether to process the data packet internally or forward the data packet for external processing, to yield a determination; and route the data packet to a corresponding destination based on the determination, the corresponding destination being one of a local enterprise network or a corresponding home cellular network of the valid source from which the data packet is received, wherein the private cellular network is configured to service a confined physical location in which home cellular networks of data packets received from valid sources do not provide cellular connectivity that meets a threshold level of cellular service.

12. The system of claim 11, further comprising:
a local core component; and
a cloud component, the local core component and the cloud component configured to provide cellular wireless services to the home endpoint.

13. The system of claim 11, wherein the one or more processors are configured to execute the computer-readable instructions to determine whether to process the data packet internally or forward the data packet for external processing based on the corresponding source of the data packet received.

14. The system of claim 13, wherein if the corresponding source is the home endpoint, the one or more processors are configured to execute the computer-readable instructions to route the data packet to the local enterprise network for processing.

15. The system of claim 13, wherein if the corresponding source is the guest endpoint, the one or more processors are configured to execute the computer-readable instructions to route the data packet to a corresponding home cellular network of the guest endpoint for processing.

16. The system of claim 15, wherein the one or more processors are configured to execute the computer-readable instructions to identify an evolved packet core of the corresponding home cellular network for routing the data packet to.

17. The system of claim 16, wherein the one or more processors are configured to execute the computer-readable instructions to identify the evolved packet core based on a device type of the corresponding source of the data packet.

18. The system of claim 17, wherein the device type indicates a priority level of the corresponding source within the corresponding home cellular network.

19. The system of claim 11, wherein the one or more processors are configured to execute the computer-readable instructions to forward the data packet to an emergency service for processing, if the data packet is a request for an emergency assistance.

20. The system of claim 19, wherein the one or more processors are configured to execute the computer-readable instructions to route the data packet to an IP Multimedia Services (IMS) of the corresponding home cellular network for processing when the data packet is an IMS request.

* * * * *